March 6, 1928.
E. O. SATHER
1,661,388
AUTOMATIC WINDSHIELD WIPER
Filed July 14, 1927
3 Sheets-Sheet 1
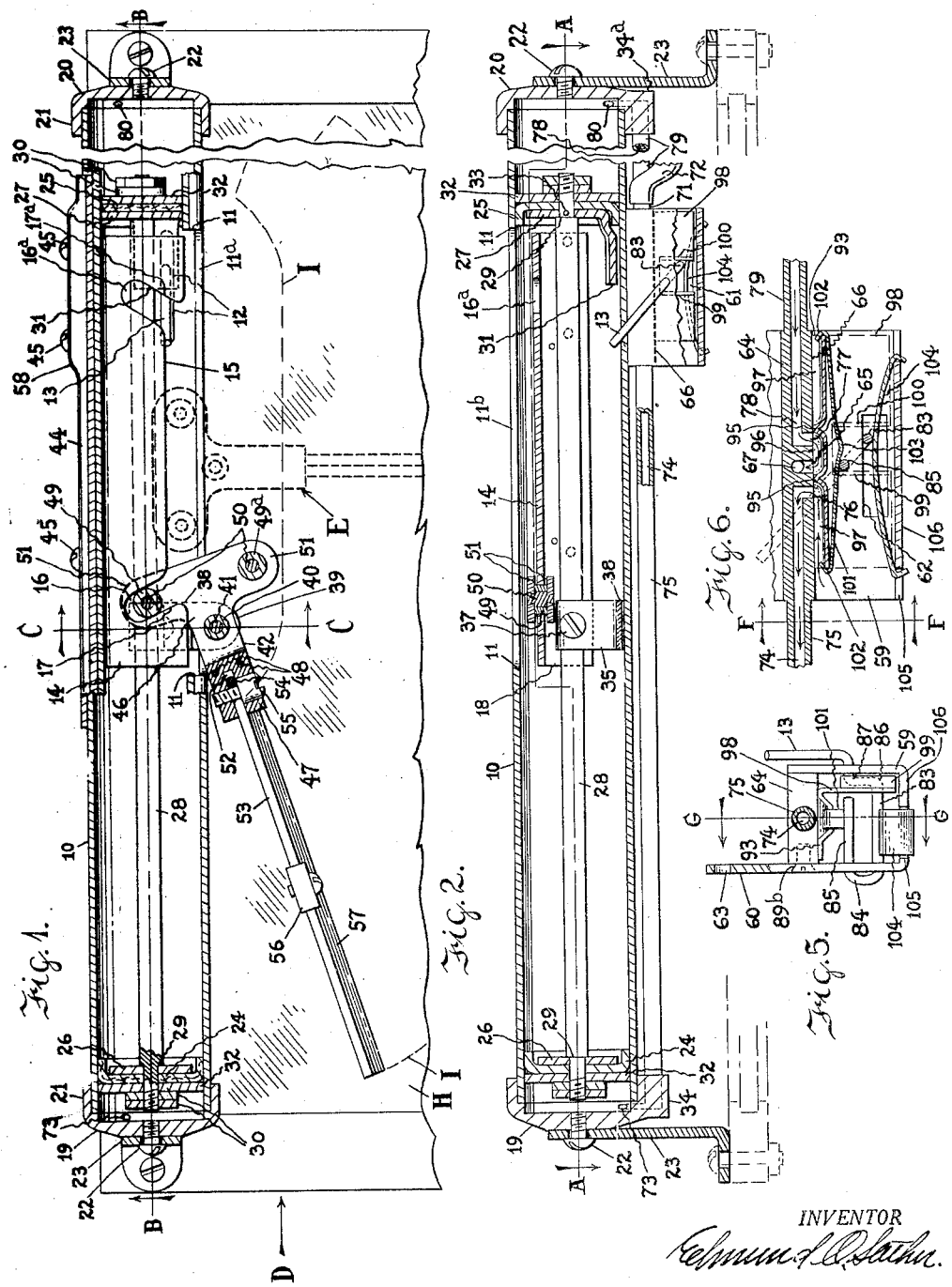
INVENTOR
Edmund O. Sather.

March 6, 1928.
E. O. SATHER
1,661,388
AUTOMATIC WINDSHIELD WIPER
Filed July 14, 1927
3 Sheets-Sheet 2
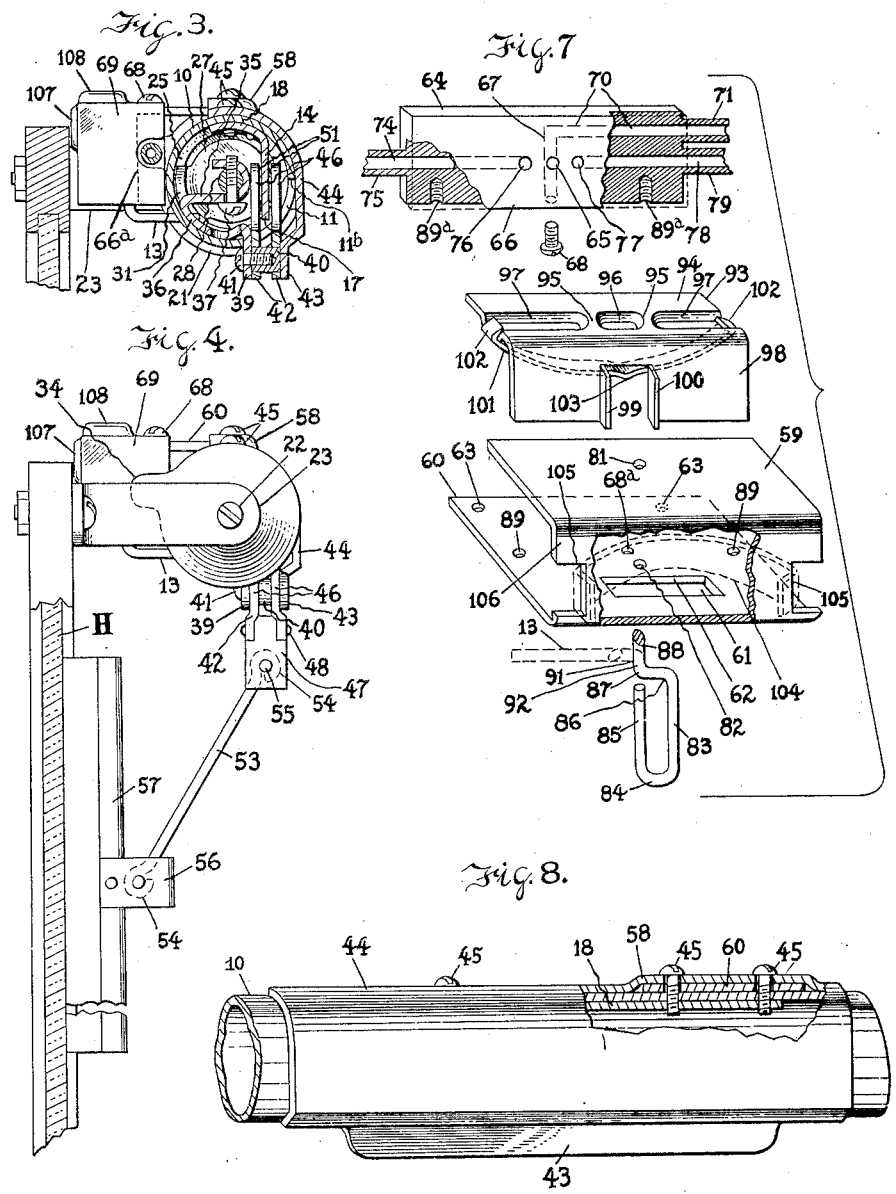
INVENTOR
Edmund O. Sather

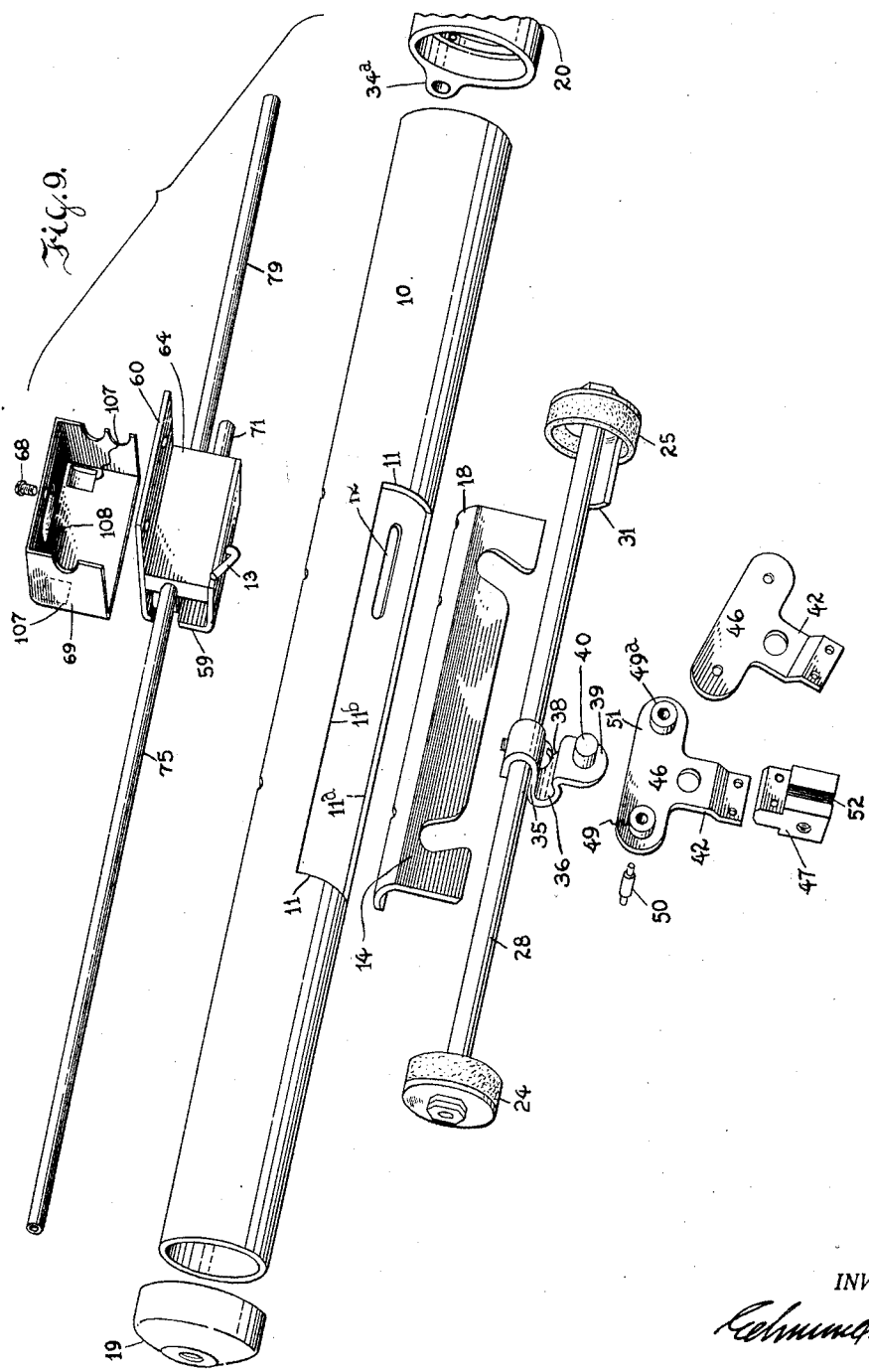

Patented Mar. 6, 1928.

1,661,388

UNITED STATES PATENT OFFICE.

EDMUND O. SATHER, OF ALAMEDA, CALIFORNIA.

AUTOMATIC WINDSHIELD WIPER.

Application filed July 14, 1927. Serial No. 205,740.

This invention relates to an improved windshield wiper and seeks, among other objects, to provide a dependable automatic device of this character operable by engine suction for cleaning the surface of the windshield.

The invention seeks, as a further object, to provide a device for imparting to a wiper element a longitudinal reciprocable travel deviating in oscillating motions at each side of travel, and wherein continuous motion will be imparted to the wiper element throughout the interval that engine suction is communicated to the device.

A further object of the invention is to provide a novel cylinder structure as well as piston and piston shaft structure together with an associated trip mechanism for imparting a continuous longitudinal reciprocable motion at its central portion of travel and deviating in oscillating motions at each side thereof, for likewise being imparted to a wiper element.

Another object of the invention is to provide a novel valve structure and associated trip mechanism for automatically reversing the travel of the pistons and wherein the valve is locked in either of its shiftable positions.

And the invention seeks, as a still further object, to provide a device which may be economically produced.

Other and incidental objects will appear hereinafter.

In the accompanying drawings:

Figure 1 is a vertical longitudinal sectional view on the line A—A of Figure 2 through the improved wiper looking in the direction indicated by the arrows. The device being shown attached to a conventional type windshield.

Figure 2 is a horizontal sectional view on the line B—B of Figure 1 looking in the direction indicated by the arrows. This view showing track member, valve arm and valve arm tappets, but with the valve mechanism frame and also the bracket on the shaft partially cut away and not in relation to the line B—B, showing a portion of the valve slide and the valve actuating spring. The face of the block is indicated by the heavy dotted lines. The cover is not shown.

Figure 3 is a transverse sectional view on the line C—C of Figure 1 looking in the direction indicated by the arrows. This view particularly showing the bracket arm and method of maintaining the pivoted reciprocable carrier in relation to the track by the retaining cover.

Figure 4 is a transverse view looking in the direction of the arrow D of Figure 1 illustrating squeegee in relation to dotted lines E of Figure 1 and as attached to a conventional type windshield, particularly showing method of adjusting the squeegee arm for obtaining proper contact of the squeegee with the windshield glass. And also means for adjustably swiveling the cylinder on its attachment brackets.

Figure 5 is a detached perspective view on an enlarged scale of the valve mechanism with the cover not shown, looking in the direction indicated by the arrows on the line F—F of Figure 6 and particularly showing the valve port block, the valve slide and the eccentric trip with their associated parts. The overlying portion of the valve mechanism frame partially cut away showing one of the holes for attachment to the cylinder.

Figure 6 is a detail sectional view through the valve mechanism on the line G—G of Figure 5 looking in the direction indicated by the arrows, and with the overlying portion cut away. This view also being shown on an enlarged scale in relation to the valve mechanism of Figure 2.

Figure 7 is a detail enlarged view of some of the parts of the valve mechanism disassembled, showing the block and the valve mechanism frame partly cut away and turned upsidedown to clearly show the location of the passages and their openings, and showing a portion of the eccentric trip in position for inserting, and also showing the valve slide in proper relative position to the block but tilted to clearly show the depressions on its face.

Figure 8 is a view of the retaining cover and partially cut away showing method of fastening the valve mechanism frame in position through attachment of its overlying portion between the cover and the cylinder.

Figure 9 is a perspective view of some of the parts of the device disassembled.

In carrying the invention into effect, I employ a cylinder 10 having an opening therein, referring to Figures 1, 2 and 9, defined on the lower extremity by its side 11$^a$ and at the upper extremity by its side 11$^b$ which is preferably positioned on a central line with the front wall of the cylinder, and being approximately one-third the length to that of the cylinder, which is defined by its ends 11. Paralleling the side 11ª and distanced therefrom, is provided a small slot 12 for freely accommodating a leg 13. Positioned within the cylinder and oppositely disposed for being adjacent the side 11ª of the opening, is a longitudinally disposed member 14 provided on its free edge with a track 15 with upwardly inclined slots 16 and 16ª at each extremity thereof, and at each extremity of the said slots are provided abutments extending below the horizontal line of the track for forming trip lugs 17 and 17ª. Extending from the upper edge of the member 14 is an angularly disposed flange 18 for anchoring the track in place within the cylinder.

Closing the cylinder 10 at its ends are heads 19 and 20 formed with rims 21 for attachment to the cylinder by frictional pressure, or otherwise suitably attached; and adjustably secured to the central portion of the heads 19 and 20 by screws 22 are attachment brackets 23 which are apertured to accommodate bolts or other suitable fastening devices for securing the device upon the front side of a windshield, conventionally illustrated at H.

Slidable in each opposite end of the cylinder 10 are, as shown in Figures 1 and 2, cup-shaped packing washers 24 and 25 hereinafter referred to as pistons, which are supported by guide washers 32 at their outer end and by reinforcement washers 26 and 27 on their inward surface, being limitably positioned upon the piston shaft 28 by abutment with shoulders 29 as particularly shown in Figure 1, and rigidly fastened upon the shaft by lock nuts 30. Reinforcement washer 27 is provided with a tappet 31 laterally extending for striking the valve leg 13 on its centrally directed travel of piston 25, and washer 27 is determinedly pinned to the piston shaft by a pin through the hole 33, as shown in Figure 2, or otherwise suitably provided with means for preventing its turning on the shaft.

Looped to partially encircle the shaft 28 and rigidly attached thereto by screw 37, as particularly shown in Figures 3 and 9, is a bracket 35 extending at a right angle from the said shaft and provided with another semi-circular oppositely directed loop 36 apertured, as shown in Figure 3, for access of screw 37, and being slidably accommodated within the wall of the cylinder, thus acting as both a guide for the shaft and a tappet 38 on its inner edge for also co-operating with the leg 13 on each centrally directed travel of the piston 24. Provided at the extremity of the tappet 38 is a perpendicularly disposed bracket arm 39 provided with an annular lug 40 which is rigidly fastened to said arm by screw 41.

Freely pivoted upon the annular lug 40 is a carrier arm 42 maintained upon the said lug for proper relation to the track 15 by the flange 43 formed in the cylinder cover 44 which is anchored, as shown in Figure 8, in position on the outer side of the cylinder by the screws 45. The said carrier arm, as partially illustrated in Figures 1 and 3 and also shown in Figure 9, consists of two adjacent T-shaped members 46 permanently attached to a spacer block 47 by rivets 48 and forming an opening between the T-shaped members to freely accommodate the rollers 49 and 49ª upon the shafts 50 at each of its open ends. The said T-shaped members being substantially larger in width than the diameter of the rollers 49 and 49ª so as to overlie the circumferential edge of the rollers thereby forming thrust guides 51 for maintaining the rollers in correct alignment with the track 15. Formed within the spacer block 47 is a slot 52 to adjustably accommodate one end of the arm 53 which is provided with looped ends 54, as indicated by dotted lines in Figure 4, adapted to be secured by a lock screw 55, as particularly shown in Figures 1 and 4. Attached through the loop 54 at the lower extremity of the arm 53, as shown in Figures 1 and 4, is a yoke 56 to which is pivoted a suitable squeegee 57. It is now noted that as the pistons are reciprocated, the bracket arm 39 traveling along upon the shaft 28 will likewise cause the carrier arm 42, which is pivoted to the annular lug 40, to travel along the rollers 49 and 49ª upon the track 15 for maintaining the carrier arm 42 across the longitudinal central portion of its travel in a perpendicularly disposed position, as indicated by the dotted lines E of Figure 1, and at the approximate limit of each opposite direction of the pistons travel the carrier arm 42 will be caused to tilt by the rollers 49 and 49ª alternately striking the trip lugs 17 and 17ª and being directed into their individual upwardly inclined slots 16 and 16ª at each opposite extremity of the said track, thereby alternately imparting an outwardly swung motion to the carrier arm 42 for likewise imparting an outwardly swung motion to the arm 53 and the squeegee 57 at each opposite limit of the piston's movement. Illustrated in Figure 1 at the limit of said movement to the left and also indicated by dotted lines I is the approximate area of movement of the squeegee upon the windshield glass H.

Depending from the cylinder 10 at its outer side and positioned near the end of the cover 44 which is formed with a bulge 58, is a substantially U-shaped valve mechanism frame 59, as referred to in Figures 5, 7 and 8, formed with an overlying tongue 60 adapted for attachment to the cylinder by apertures 63 on its outer end; and oppositely disposed from the said apertures is provided an opening 61 for defining a stop shoulder 62 which is positioned adjacent to the rear wall 106 for coacting with the eccentric trip trip 83. Depending from the upper member of the said frame and horizontally disposed, as indicated by dotted lines 66ª of Figure 3, is a block 64 screw threaded correspondingly with apertures 89 of the frame at 89ª for receiving screws as indicated at dotted lines 89ᵇ of Figure 5, for attachment thereto. The said block is formed, as best shown in Figures 6 and 7, with a passage 65 extending from the central portion of the face 66 communicating with a perpendicular passage 67, screwthreaded at its upper end for receiving a valve cover retaining screw 68 extending through the aperture 68ª of the frame for holding the valve mechanism cover 69 in place, and connected at its lower end is a horizontally disposed passage 70 at the outer end of which is a nipple 71 to receive a hose or pipe 72 for communicating with the intake manifold of the engine (not shown) or otherwise connected with the engine so that the engine suction will operate through the pipe. Provided in the head 19, as shown in Figures 1 and 2, is a passage 73 opening from the interior chamber of the cylinder 10 for communicating with the passage 74, as shown in Figure 2, through a centrally directed tube 75 attached to the lug 34 of the said head and, as particularly shown in Figures 6 and 7, communicating with the passage 76 opening into the flat face 66 of the block 64 at one side of the passage 65. Opening through the face 66 of the block at the opposite side of the passage 65 is, as also shown in Figures 6 and 7, a passage 77 communicating with the passage 78 through the tube 79 attached to the lug 34ª communicating with the passage 80 of the head 20 and opening into the chamber of the cylinder 10.

Supported within the mechanism frame 59 and journaled through the bearings 81 and 82, as shown in Figures 5 and 7, is pivoted a perpendicularly disposed eccentric trip 83 composed of a plurality of angles formed from an annular wire, as best shown in Figure 7, with an arch 84 providing an upstanding annular stud 85 paralleling its opposite portion which is angularly disposed at 86 to form an eccentric trip 83 and for placing the said portion in an overlying position to the end of the said annular stud 85 which is distanced to provide an opening therebetween, and also angularly disposed at 87 to place the portion 88, as illustrated in Figure 7, in alignment with the opposite annular stud 85. Now, to facilitate the installation of the above mentioned eccentric trip to the valve mechanism frame 59; the portion 88 is inserted through the opening 61 of the frame and entering the bearing 81 while the annular stud 85 is entered through the opposite bearing 82, after which the portion 88 is provided with still another angle at 91 oppositely directed from the eccentric trip 83 providing a journal 92 and a laterally directed leg 13 for alternately coacting with each of the tappets 31 and 38.

Provided for being slidable upon the face 66 of the block 64, as shown in Figures 5, 6 and 7, is a flat channeled valve 93. The valve, as best shown in Figure 7, is formed with a channel extending across the central portion of its flat face 94 with partitions 95 defining a pocket 96 therein, and passages 97 opening at their each opposite end, and on its lower edge with a laterally extended portion 98. Centrally positioned on the laterally extending portion 98 of the valve is an opening provided with downwardly directed flanges 99 and 100 on each side thereof for alternately coacting with the eccentric trip 83 and also slidably coacting with the inner surface of the lower portion of the frame 59, thus providing a guide for maintaining the laterally extended portion 98 of the valve in an elevated position from the said lower portion of the frame. A flat spring 101, as best shown in Figure 7, hooked at its ends 102 for being attachably received by the valve 93, and crimped at its central portion to produce a hump 103 provided for coacting with the annular stud 85 for maintaining valve 93 flat against the face 66 of the block 64, and the said hump locking the valve in either of its shiftable positions, so as to prevent its movement only when the valve is struck by the eccentric trip 83. Another flat spring 104 is provided for coacting with the eccentric trip 83 hooked at its each extremity for being received in notches 105 in the rear wall 106 of the frame 59, and positioned out of range of the flanges 99 and 100 of the laterally extended portion of the valve.

For surrounding the mechanism frame on its upper and rear walls and overlying its open ends, is provided a cover 69 with pockets 107 formed therein on its rear wall, as best shown in Figures 3 and 9, for accommodating each of the free ends of the spring 104, and a bulge is provided on its upper surface for defining a pocket 108 positioned to accommodate the arch 84 of the eccentric trip 83, thus providing means for enclosing the valve mechanism for excluding dust and dirt.

As will now be seen in view of the foregoing, the valve mechanism will function as follows: When the tappet 31 strikes the leg 13 it will swing the eccentric trip 83 journaled in the bearings 81 and 82 away from the stop shoulder 62 and past the dead center of the tensional thrust exerted against the eccentric trip by the spring 104 and cause the said eccentric trip to snap sideways for striking the shoulder 100 of the valve slide 93 and again lodging the eccentric trip at the opposite side against the stop shoulder 62, thus limiting its movement, and thereby also shifting the said valve past the tension of the hump 103 of the spring 101 bearing against the annular stud 85, and the outward movement of the valve is limited by lodgment of its shoulder 99 against the said annular stud, placing the valve in the position as illustrated in Figures 2 and 6, thereby connecting the passage 65 and 77 through passage 78 directed through the tube 79 with the passage 80 opening from the chamber of the cylinder 10, so that engine suction will be communicated in the direction indicated by the arrows, as shown in Figure 6, in the said passages for connecting to the end of the cylinder, and the piston 25 together with the shaft 28 and the opposite piston 24 will be drawn towards the said end, which is to the right in the drawings. And of course, the vacuum from the following or left hand piston is relieved through the opened opposite passage 76 on the face 66 and communicating through the passage 74 of the tube 75 with the passage 73 in the opposite head 19. Sufficient room is provided in the opening between the shoulders 99 and 100 for allowing the eccentric trip 83 to strike against them at its either movement with considerable force; this blow will not only tend to shift the valve but will also tend to break the seal between the valve and the flat face 66 of the block. The bracket arm 39 connected to the central portion of the aforesaid shaft 28 will likewise impart the aforesaid reciprocable motion of the pistons to the carrier arm 42 pivoted thereto, and coacting through the roller 49, as shown in Figure 1, with the side of the slot 16 and be pulled out upon the inclined edge of the said slot for bringing the rollers 49 and 49ᵃ in contact with the track 15, thus imparting an inwardly swung motion to the carrier arm to the right and imparting a vertical longitudinally directed motion to the same across the major portion of the said track, and at the opposite extremity of the track the roller 49ᵃ will strike the abutment shoulder 17ᵃ, with the result that the said roller will be directed into the slot 16ᵃ for lifting the roller 49 from the track for terminating on this stroke of the pistons with an outwardly swung motion to the carrier arm and likewise actuating the wiper element carried therefrom, and the tappet 38 will, of course, be caused to strike the leg 13 of the eccentric trip 83 for again shifting the valve; and, as will be seen, the mechanism will function to reverse the movement of the pistons and their component parts at the end of their travel in each opposite direction as long as the engine suction is communicated through the pipe 72. A valve for the control of the engine suction is employed and placed in a suitable position for starting and stopping the device at the will of the operator.

In the drawings, I have shown but one specific form of my invention, but it is to be understood that the invention may be embodied in other and different forms, each being a species of my invention, and the patent protection that I desire is all of that which comes within the spirit and scope of what I claim as new, and which claims are the following:

1. In a windshield wiper mechanism, a cylinder, heads closing the ends of the cylinder, a piston reciprocable in each end of the cylinder, a longitudinally disposed reciprocable member secured to the pistons, a reciprocable carrier having two operating members and means for being pivotably carried by the said reciprocable member, and means provided for directing the reciprocable carrier while reciprocated with a longitudinal movement and alternately oscillating movements at each end of travel, a longitudinally disposed opening in the wall of the cylinder on a line with the path of the reciprocable carrier, a wiping element operated through the opening in the wall of the cylinder and carried by the reciprocable carrier, and means provided for automatically reversing the travel of the pistons.

2. In a windshield wiper mechanism, a cylinder, heads closing the ends of the cylinder, a piston reciprocable in each end of the cylinder, a longitudinally disposed reciprocable member secured to the pistons, a reciprocable carrier having two operating members and means for being pivotably carried by the said reciprocable member and coacting with means provided for directing the reciprocable carrier while reciprocated for imparting a longitudinal movement and alternately oscillating movements to a wiper element carried thereon at each end of travel, a longitudinally disposed opening in the wall of the cylinder on a line with the path of the reciprocable carrier through which the wiper element is operated, a longitudinal stationary member adapted to slidably co-operate with the reciprocable carrier, and means provided for automatically reversing the travel of the pistons.

3. In a windshield wiper mechanism, a cylinder, heads closing the ends of the cylinder, a piston reciprocable in each end of the cylinder, a longitudinally disposed reciprocable member secured to the pistons, a reciprocable carrier having two operating members and provided with means for being pivotably carried by the said reciprocable member for longitudinal and oscillating movements, a longitudinally disposed opening in the wall of the cylinder on a line with the path of the reciprocable carrier, a longitudinal stationary member adapted to slidably co-operate with the reciprocable carrier along its path of travel for maintaining same upon its pivotable means, a wiping element operated through the opening in the wall of the cylinder and carried by the reciprocable carrier, a longitudinally disposed stationary member anchored within the cylinder and having a horizontal longitudinally disposed surface on its free edge extending along a major portion thereon and opening into two oppositely inclined predeterminedly spaced open slots at each opposite end therein, and the outer portion of each respective open slot extending beyond the horizontal line of the said longitudinally disposed surface for thus defining two oppositely disposed abutment shoulders thereat, and the aforesaid reciprocable carrier and the two operating members adapted to align with and ride upon the aforesaid longitudinally disposed surface maintaining the reciprocable carrier for longitudinal travel while thereon and the two operating members alternately co-operating with the individual open slots therein for imparting an oscillating movement to the reciprocable carrier at each consecutive side of its travel thereon, and means for automatically reversing the travel of the pistons.

4. In a windshield wiper mechanism, a cylinder, heads closing the ends of the cylinder, a piston reciprocable in each end of the cylinder, a longitudinally disposed reciprocable member secured to the pistons, a reciprocable bracket arm secured thereto and being adapted to bear against the inner wall of the cylinder for preventing misalignment of the reciprocable member and provided with a pivotable means, a reciprocable carrier having two operating members and carried upon the said pivotable means for longitudinal and oscillating movement, a longitudinally disposed opening in the wall of the cylinder on a line with the path of the reciprocable carrier, a longitudinal stationary member extending along the side of the path of travel of the reciprocable carrier for maintaining same upon its pivotable means, a wiping element operated through the opening in the wall of the cylinder and carried by the reciprocable carrier, a longitudinally disposed stationary member anchored within the cylinder having a horizontal longitudinally disposed surface on its free edge extending along a major portion thereon and opening into two oppositely inclined predeterminedly spaced open slots at each opposite end therein, and the outer portion of each respective open slot extending beyond the horizontal line of the said longitudinally disposed surface for thus defining two oppositely disposed abutment shoulders thereat, and the aforesaid reciprocable carrier and the two operating members adapted to align with and ride upon the aforesaid longitudinally disposed surface and the two operating members alternately co-operating with the individual open slots therein, so that when the said reciprocable carrier is actuated, the two operating members will tend to maintain the wiping element carried by the reciprocable carrier in a horizontal position across the major portion of its movement, and the said operating means will alternately strike against their respective abutment shoulders for being directed into their individual open slots for alternately raising the opposite operating member individually from the longitudinally disposed surface for alternately tilting the reciprocable carrier in opposite oscillating motions at each opposite side of its travel thereon, and means for automatically reversing the travel of the pistons.

5. In a windshield wiper mechanism, a cylinder, heads closing the ends of the cylinder, a piston reciprocable in each end of the cylinder, a longitudinally disposed reciprocable member secured to the pistons, a reciprocable bracket arm secured thereto and adapted to bear against the inner wall of the cylinder for preventing misalignment of same and provided with a pivotable means, a reciprocable carrier having two operating members and a laterally directed portion pivotably carried by the said reciprocable bracket arm for longitudinal and oscillating movements, a longitudinally disposed opening in the wall of the cylinder on a line with the path of the reciprocable carrier, a wiping element carried by the reciprocable carrier and operated through the said opening, a longitudinal stationary member extending along the side of the path of the said reciprocable carrier for slidably maintaining the said reciprocable carrier upon its pivotable means, a longitudinal stationary member anchored within the cylinder for co-operation with the said reciprocable carrier and having a horizontal longitudinally disposed surface on its free edge extending along a major portion thereon and opening into two oppositely inclined predeterminedly spaced open slots at each opposite end therein, and the outer portion of each respective open slot extending beyond the horizon of the said longitudinally disposed surface for thus defining two oppositely disposed abutment shoulders thereat, and the aforesaid reciprocable carrier and the two operating members adapted to straddle and ride upon the aforesaid longitudinally disposed surface and the two operating members alternately co-operating with the individual open slots therein, so that when the said reciprocable carrier is actuated the two operating members will tend to maintain the said carrier in a parallel position across the major portion of its movement, and the said operating members will alternately strike against their respective abutment shoulders for being directed into their individual open slots for alternately raising the opposite operating member individually from the longitudinally disposed surface for alternately tilting the reciprocating carrier in opposite oscillating motions, whereby, while the longitudinal member is reciprocated, a longitudinally directed motion will be imparted to the wiping element carried by the laterally directed portion of the reciprocable carrier across the major portion of its travel and is alternately terminated in opposite oscillating motions at each opposite side of its travel for cleaning the surface of the windshield on the path of the said wiping element, and means provided for automatically reversing the travel of the pistons.

6. In a windshield wiper mechanism, a cylinder, a suction operated piston reciprocable in each end of the cylinder and connected to a longitudinally disposed reciprocable member, heads closing the ends of the cylinder and provided with passages, two centrally directed tubes extending therefrom and communicating through the said passages for communication with a member provided with a flat face depended from the cylinder on its side, and positioned towards the longitudinal central portion of same at the rear of the reciprocable path of the longitudinally disposed member, a valve associated with the flat face of the member for alternately connecting the ends of the cylinder through said passages with a source of suction, and means carried by the longitudinally disposed reciprocable member connected to the piston for actuating the said valve.

7. In a windshield wiper mechanism, a cylinder, a suction operated piston reciprocable in each end of the cylinder and connected to a longitudinally disposed reciprocable member, and the said longitudinally disposed member adapted to co-operate with means for actuating a wiper element for being carried therewith adapted for longitudinal and opposite oscillating movements, a single longitudinally slidable valve mounted at a position towards the central longitudinal portion of the cylinder at the rear side of the path of the reciprocable longitudinally disposed member, means including an eccentric trip pivotably mounted within a frame opposite the valve for snapping the valve in opposite directions for alternately connecting the ends of the cylinder with a source of suction, and coacting with means carried by the longitudinally disposed reciprocable member operable with the piston for actuating the eccentric trip.

8. In a windshield wiper mechanism, a cylinder, a suction operated piston reciprocable in each end of the cylinder and connected to a longitudinally disposed reciprocable member, and the said longitudinally disposed member adapted to co-operate with means for actuating a wiper element for being carried therewith, and the said wiper element adapted for longitudinal and opposite oscillating movements, heads closing the ends of the cylinder, a frame adapted for being depended from the cylinder at its rear side and offset from the central portion thereof on a parallel line with the reciprocable path of the longitudinally disposed member, a block provided with a flat face rigidly secured in the frame with passages therein leading from the flat face to passages formed in the heads for communicating interiorly with the cylinder, a single valve with a laterally directed portion and being longitudinally slidably mounted upon the said flat face of the block, an eccentric trip journaled within the said frame and being limitably movable, a flat spring bearing between the eccentric trip and the frame, a lost-motion connection directly connecting the eccentric trip with the laterally directed portion of the valve for moving the valve in opposite directions to alternately connect the opposite ends of the cylinder with a source of suction, and coacting with means carried by the longitudinally disposed reciprocable member operable with the piston for actuating the said eccentric trip.

9. In a windshield wiper mechanism, a cylinder, a suction operated piston reciprocable in each end of the cylinder and connected to a longitudinally disposed reciprocable member, and the said longitudinally disposed member adapted to pivotably co-operate with means carrying a wiper element for being reciprocated therewith, and the said wiper element adapted for longitudinal and opposite outwardly directed oscillating movements, heads closing the ends of the cylinder, a frame adapted for being depended from the cylinder at its rear side and offset from the central portion thereof on a parallel line with the reciprocable path of the longitudinally disposed member, a member provided with a flat face rigidly secured in the frame with passages therein leading from the flat face thereof to passages formed in the heads for communicating interiorly with the cylinder, a single valve with a laterally directed portion and being slidably mounted upon the said flat face of the member, an eccentric trip pivoted in the frame and being limitably movable, a flat spring bearing between the eccentric trip and the frame, a flat spring provided with a hump and bearing between an axial central portion of the eccentric trip and the said valve, a lost-motion connection directly connecting the eccentric trip with the laterally directed portion of the valve for moving the valve in opposite directions to alternately connect the opposite ends of the cylinder with a source of suction, and coacting with means carried by the longitudinally disposed reciprocable member operable with the piston for actuating the eccentric trip.

10. In a windshield wiper, a guideway, a wiper mounted on said guideway for reciprocation across the windshield in a longitudinal path, means for reciprocating said wiper, and means in the path of the wiper for engaging the same to swing it in an arc at the end of its longitudinal movement.

In testimony whereof, I have hereunto set my hand at Berkeley, California, this 8th day of July, 1927.

EDMUND O. SATHER.